(12) United States Patent
Zhu et al.

(10) Patent No.: US 10,715,193 B2
(45) Date of Patent: Jul. 14, 2020

(54) NOTIFICATION OF RECEIVER CAPABILITIES

(71) Applicant: INTEL CORPORATION, Santa Clara, CA (US)

(72) Inventors: Yuan Zhu, Beijing (CN); Xiaogang Chen, Beijing (CN); Alexei Davydov, Nizhny Novgorod (RU); Seunghee Han, Cupertino, CA (US); Qinghua Li, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/440,863

(22) PCT Filed: Dec. 3, 2013

(86) PCT No.: PCT/US2013/072912
§ 371 (c)(1),
(2) Date: May 5, 2015

(87) PCT Pub. No.: WO2014/089110
PCT Pub. Date: Jun. 12, 2014

(65) Prior Publication Data
US 2015/0304063 A1  Oct. 22, 2015

Related U.S. Application Data

(60) Provisional application No. 61/732,851, filed on Dec. 3, 2012.

(51) Int. Cl.
*H04B 1/12* (2006.01)
*H04W 72/12* (2009.01)
(Continued)

(52) U.S. Cl.
CPC ............ *H04B 1/12* (2013.01); *H04B 1/3827* (2013.01); *H04B 7/0452* (2013.01);
(Continued)

(58) Field of Classification Search
USPC ......................................... 370/329
See application file for complete search history.

(56) References Cited

U.S. PATENT DOCUMENTS

2009/0190544 A1* 7/2009 Meylan ............... H04L 5/0053
                                                              370/329
2010/0075705 A1* 3/2010 van Rensburg ........ H04B 7/024
                                                              455/509
(Continued)

FOREIGN PATENT DOCUMENTS

CN   101599785 A   12/2009
CN   101771505 A   7/2010
(Continued)

*Primary Examiner* — Gregory B Sefcheck
*Assistant Examiner* — Majid Esmaeilian
(74) *Attorney, Agent, or Firm* — Fish & Richardson P.C.

(57) ABSTRACT

Disclosed is a user equipment (UE) apparatus, and method to facilitate beamforming between at least one eNB and at least one UE, comprising the at least one UE including an indication in a message from the UE to the at least one eNB of a type of receiver available for use by the UE to receive a return message from the eNB. There is also disclosed a method in an eNB to facilitate beamforming, and a UE and eNB arranged to carry out the described methods.

18 Claims, 8 Drawing Sheets

(51) Int. Cl.

| | | |
|---|---|---|
| H04B 1/3827 | (2015.01) | |
| H04W 84/18 | (2009.01) | |
| H04W 92/18 | (2009.01) | |
| H04W 72/04 | (2009.01) | |
| H04L 25/03 | (2006.01) | |
| H04W 76/14 | (2018.01) | |
| H04W 76/27 | (2018.01) | |
| H04W 76/28 | (2018.01) | |
| H04L 5/00 | (2006.01) | |
| H04B 17/24 | (2015.01) | |
| H04B 17/26 | (2015.01) | |
| H04B 17/345 | (2015.01) | |
| H04L 1/18 | (2006.01) | |
| H04W 36/10 | (2009.01) | |
| H04W 52/40 | (2009.01) | |
| H04J 11/00 | (2006.01) | |
| H04W 72/08 | (2009.01) | |
| H04W 52/02 | (2009.01) | |
| H04L 1/00 | (2006.01) | |
| H04W 24/02 | (2009.01) | |
| H04L 25/02 | (2006.01) | |
| H04B 7/0452 | (2017.01) | |
| H04B 7/06 | (2006.01) | |
| H04B 7/155 | (2006.01) | |
| H04W 24/10 | (2009.01) | |
| H04W 40/16 | (2009.01) | |
| H04L 27/00 | (2006.01) | |
| H04W 84/04 | (2009.01) | |

(52) U.S. Cl.
CPC ....... *H04B 7/0617* (2013.01); *H04B 7/15557* (2013.01); *H04B 17/24* (2015.01); *H04B 17/26* (2015.01); *H04B 17/345* (2015.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/0206* (2013.01); *H04L 25/03305* (2013.01); *H04W 24/02* (2013.01); *H04W 24/10* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/14* (2018.02); *H04W 76/27* (2018.02); *H04W 76/28* (2018.02); *H04W 84/18* (2013.01); *H04W 92/18* (2013.01); *H04L 27/0008* (2013.01); *H04W 40/16* (2013.01); *H04W 72/1205* (2013.01); *H04W 84/042* (2013.01); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/24* (2018.01)

(56) References Cited

U.S. PATENT DOCUMENTS

| | | | |
|---|---|---|---|
| 2010/0202503 A1* | 8/2010 | Dietl | H04B 7/0417 375/227 |
| 2011/0002371 A1* | 1/2011 | Forenza | H04B 7/0417 375/227 |
| 2011/0064043 A1 | 3/2011 | Balachandran et al. | |
| 2011/0230199 A1 | 9/2011 | Patabandi et al. | |
| 2011/0310994 A1* | 12/2011 | Ko | H04B 7/0639 375/295 |
| 2012/0134429 A1* | 5/2012 | Hoymann | H04B 7/024 375/259 |
| 2012/0269143 A1 | 10/2012 | Bertrand et al. | |
| 2012/0307939 A1* | 12/2012 | Kalyani | H04L 25/0216 375/316 |
| 2013/0089040 A1* | 4/2013 | Tabet | H04L 5/0073 370/329 |
| 2013/0121243 A1* | 5/2013 | Vermani | H04L 1/0029 370/328 |
| 2013/0156013 A1* | 6/2013 | Huang | H04W 72/04 370/336 |
| 2013/0201848 A1* | 8/2013 | Kazmi | H04W 24/00 370/252 |
| 2014/0112262 A1* | 4/2014 | Mallik | H04L 5/0073 370/329 |
| 2014/0301303 A1* | 10/2014 | Roman | H04L 5/0073 370/329 |
| 2015/0117327 A1* | 4/2015 | Nordstrom | H04W 72/082 370/329 |
| 2015/0131749 A1* | 5/2015 | Slomina | H04J 11/005 375/260 |

FOREIGN PATENT DOCUMENTS

| | | |
|---|---|---|
| CN | 101807979 A | 8/2010 |
| CN | 102291759 A | 12/2011 |
| EP | 2 346 201 A2 | 7/2011 |
| WO | WO 2012/052538 A1 | 4/2012 |

\* cited by examiner

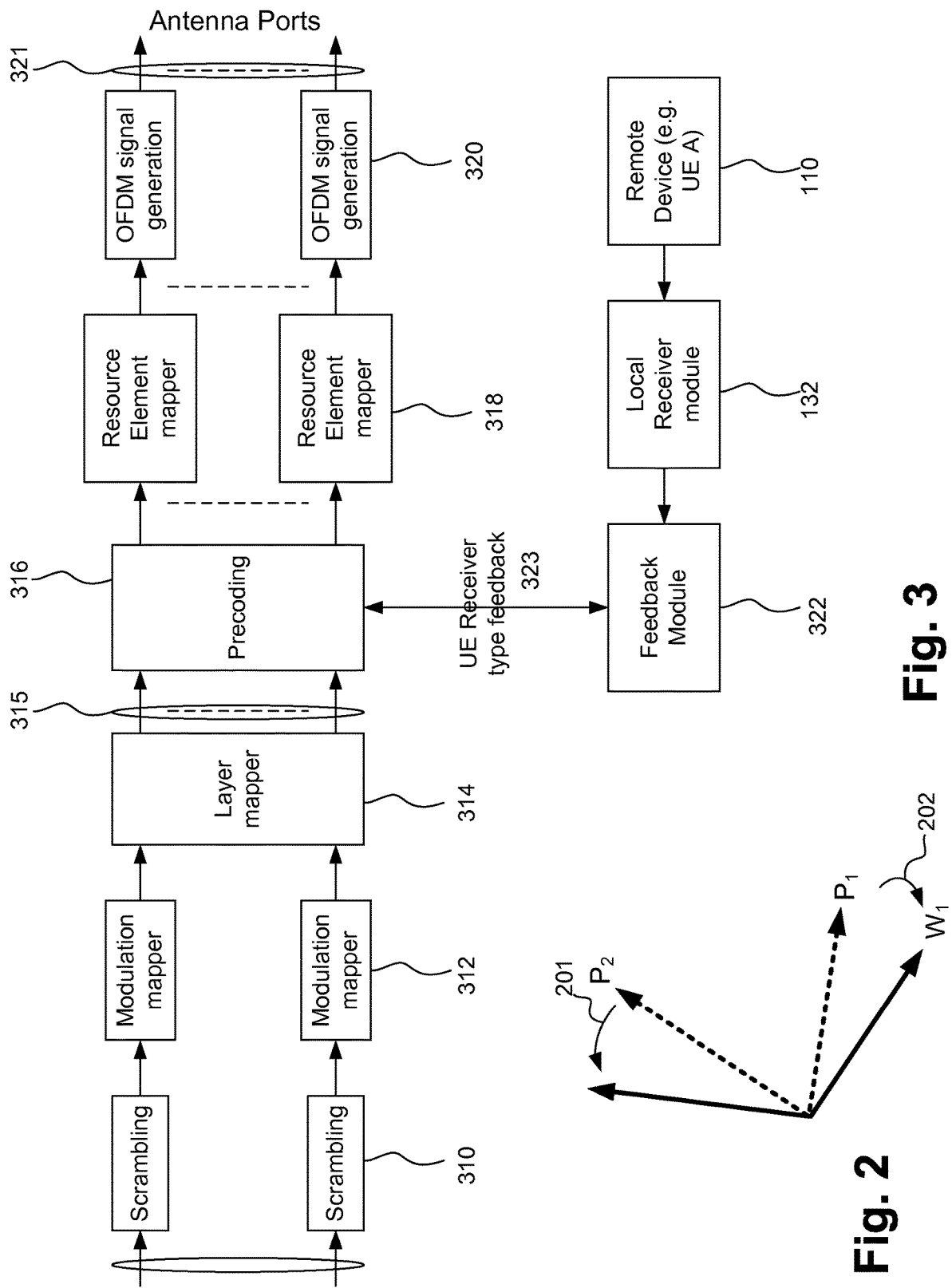

NOTIFICATION OF RECEIVER CAPABILITIES

CROSS REFERENCE TO RELATED APPLICATIONS

This application is a 371 U.S. Nationalization of Patent Cooperation Treaty Application PCT/US2013/072912, filed Dec. 3, 2013, which claims the benefit of U.S. Provisional Patent Application No. 61/732,851, filed Dec. 3, 2012, each of which are incorporated herein by reference in their entirety.

FIELD

Embodiments described herein relate generally to the field of communications, and more particularly, to notification of receiver capabilities in a wireless communications system.

BACKGROUND INFORMATION

As multimedia communications have become more popular for mobile electronic devices, mobile electronic device users have increasingly desired reliable high data rate transmissions. Multi-user multiple input multiple output (MU-MIMO) can be used to meet the demand for higher data rates and better improved wireless coverage even without increasing average transmit power or frequency bandwidth because the MU-MIMO structure uses multiple spatial layers to deliver multiple data streams using a given frequency-time resource.

MU-MIMO is a radio communication technique using a transmitter and receivers that each have multiple antennas to wirelessly communicate with one another. Using multiple antennas at the transmitter and receivers allows the spatial dimension to be applied to improve the performance and throughput of a wireless link. MIMO communication can be performed in an open loop or closed loop technique. A transmitter using the open loop MIMO technique has minimal knowledge of the channel condition before signals are transmitted to a receiver. In contrast, closed loop MIMO can feed back channel-related information from the transmitter to the receiver to allow the transmitter to modify transmit signals before the signals are transmitted to better match channel state conditions. The amount of feed-back information that is delivered from a receiver to a transmitter in a system using closed loop MIMO can be very large. The ability to increase the transmission quality of the feedback channel in a closed loop MIMO system can be useful.

BRIEF DESCRIPTION OF THE DRAWINGS

Embodiments described herein are illustrated by way of example, and not by way of limitation, in the figures of the accompanying drawings in which like reference numerals refer to similar elements:

FIG. 2 schematically illustrates an example of a multiuser (MU)-zero forcing operation to make multiple precoders orthogonal with each other in accordance with various embodiments;

FIG. 3 schematically illustrates use of precoding on wireless transmissions in accordance with various embodiments;

DESCRIPTION OF THE EMBODIMENTS

Figure 1:
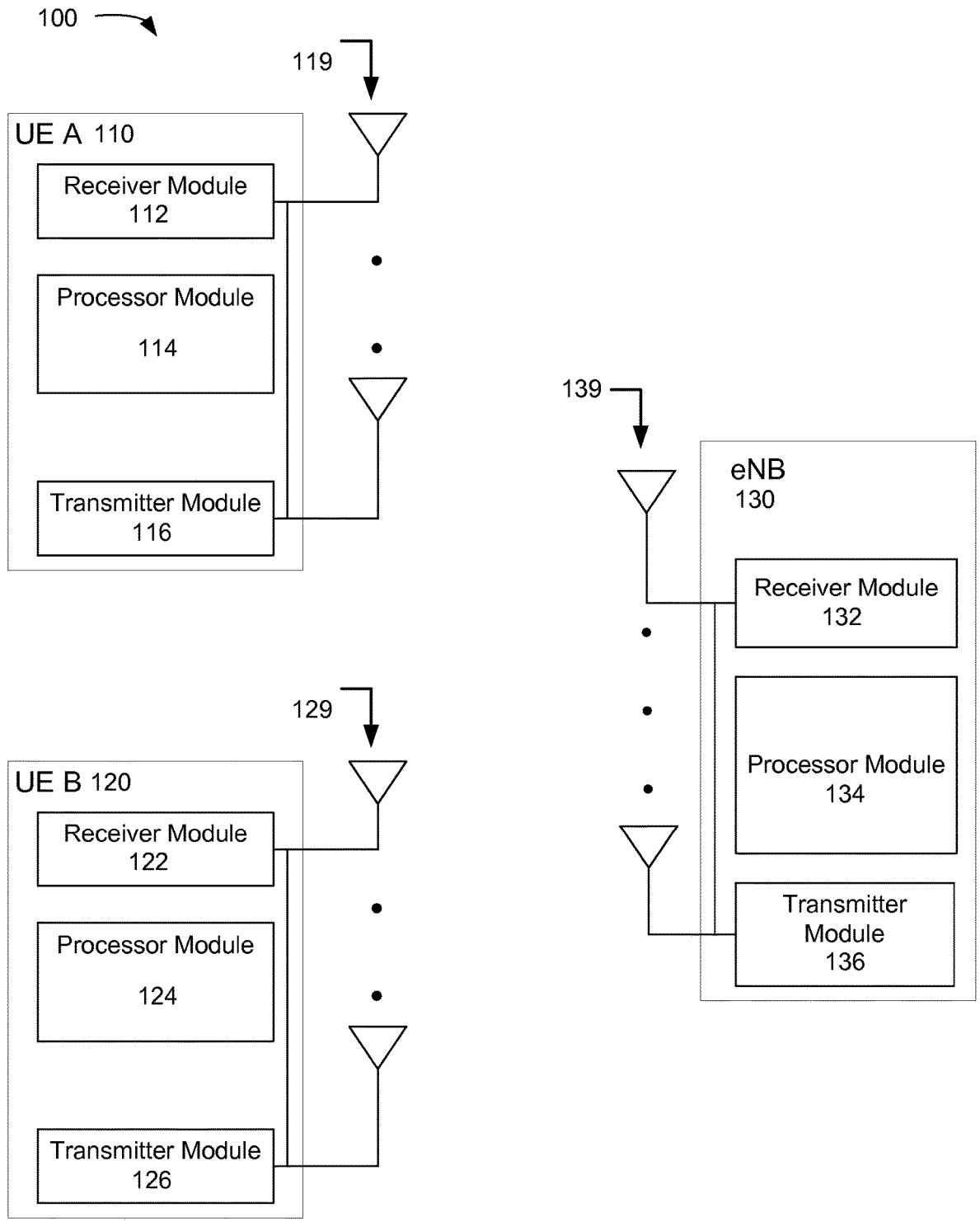
FIG. 1 schematically illustrates a wireless communication network in accordance with various embodiments.

Illustrative embodiments of the present disclosure include, but are not limited to, methods, systems, and apparatuses for the notification of user equipment receiver capabilities in a wireless communication network.

Various aspects of the illustrative embodiments will be described using terms commonly employed by those skilled in the art to convey the substance of their work to others skilled in the art. However, it will be apparent to those skilled in the art that some alternate embodiments may be practiced using with one or more specified portions of the described embodiments. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations may be described as multiple discrete operations, in turn, in a manner that is most helpful in understanding the illustrative embodiments; however, the specific order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

MU-MIMO (multiuser multiple input multiple output) is a form of MIMO that uses multiple independent radio terminals in order to enhance the communication capabilities of the individual terminals. MU-MIMO allows a terminal to transmit or receive signals between the terminal and multiple users or multiple devices in the same band simultaneously. MU-MIMO can leverage multiple users as spatially distributed transmission resources by using additional signal processing power. MU-MIMO can enhance MIMO systems where there are multiple users or connections.

FIG. 1 schematically illustrates a wireless communication network 100 in accordance with various embodiments, in this example a MU-MIMO system with a multiple transmitter and receiver antenna configuration for the radio links. These types of systems can use multicarrier communication for transmitting data by dividing the data into narrow-band sub-carriers or tones. An example of a multi-carrier technique is orthogonal frequency division multiplexing (OFDM) in which the multiple sub-carriers are orthogonal to each other. Wireless communication network 100 may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN). The wireless communication network 100 may include a base station, e.g., an enhanced node base station (eNB) 130, and configured to wirelessly communicate with one or more mobile device(s) or terminal(s), e.g., first user equipment (UE) A 110 and/or second UE B 120. While example embodiments are described with reference to an LTE wireless communication network, some embodiments may be used with other types of wireless communication/access networks.

In more detail, the eNB 130 may include a receiver module 132 with which to receive wireless signals, via wireless channels, from UE A 110 and/or UE B 120 via one or more antennas 139. The eNB 130 may also include a transmitter module 136 with which to transmit signals, via wireless channels, to UE A 110/UE B 120 via the one or more antennas 139. eNB 130 may also include a processor module 134 coupled between receiver module 132 and transmitter module 136 and configured to encode and decode information communicated by the signals. Each wireless channel may be a MIMO channel. When using multicarrier communication, each of the transmit antennas may have a corresponding multicarrier transmitter/receiver associated therewith. A MIMO system may include the use of two or more transmitters for both the transmitter(s) and the receiver(s). An MU-MIMO system may also include multiple transceivers that each may use only a single antenna, or a plurality of antennas.

UE A 110 may include a receiver module 112, a transmitter module 116, a processor module 114, and one or more suitable antennas 119. Receiver module 112 and transmitter module 116 may be coupled to one or more suitable antennas 119 to transmit and receive wireless signals to/from eNB 130. Similarly, UE B 120 may include a receiver module 122, a transmitter module 126, a processor module 124, and one or more suitable antennas 129. Receiver module 122 and transmitter module 126 may be coupled to one or more suitable antennas 129 to transmit and receive wireless signals to/from eNB 130. As used herein, UE A 110 and UE B 120 may be identical in capabilities, thus their terms may be used interchangeably. However, in some embodiments, UE A 110 may have different capabilities to UE B 120, for example UE A 110 may have a different receiver type to UE B 120. In such a case, the terms may not be used interchangeably, when said use is dependent on the capabilities at any given point in the description, as will be apparent to the skilled person. Processor module 114/124 may be coupled to receiver module 112/122 and transmitter module 116/126 and be configured to decode and encode information transmitted in signals communicated between the UE A 110/UE B 120 and the eNB 130.

Multi-user MIMO transmission is a key technology to boost the spectrum efficiency in cellular networks. With the help of a UE specific reference signal (UERS) to decode downlink channels, for example the Physical Downlink Shared Channel (PDSCH), it may be possible to apply improved arbitrary precoding vectors to the UERS and PDSCH. One of the most popular MU-MIMO precoding vector calculation methods is multiuser (MU)-zero forcing. It can be mathematically described in equation (1) as below:

$$w_i = \left( \sum_j \gamma_j \cdot p_j p_j^H + I \right)^{-1} p_i \quad (1)$$

where $p_i$ is the recommended precoder by UE i, $p_j$ is the recommended precoder by UE j, I is the identity matrix, $\gamma_j$ is the channel quality information of UE j, $p_j^H$ is the transform of $p_j$, and $w_i$ is the zero forcing precoder for UE i.

An MU-zero forcing operation, such as the one noted above, is trying to make $w_i$ orthogonal to $p_j$ where i≠j, so that inter-UE interference can be minimized. A more straight forward illustration can be viewed in FIG. 2, where it is shown that the post adjustment precoding vector $w_1$ for a first UE (e.g. UE A 110) and an adjustment precoding vector $w_2$ for a second UE (e.g. UE B 120) may no longer match the recommended precoding vectors for the first and second UE's (i.e. $p_1$ and $p_2$, respectively).

It can be seen that after transmitter side zero forcing operations (e.g. first UE transmitter side zero forcing operation 201 and second UE transmitter side zero forcing operation 202), the inter UE interference has been minimized. The transmitting side may be termed the transmission point in the following. However, as a price for the minimization of the inter-UE interference, the signal energy reaching the UE is compromised because the transmitting beam no longer matches the UE recommended beam. If the signal energy degradation is less than the inter-UE interference suppression, the UE may experience signal-to-interference-plus-noise ratio (SINR) gain. Otherwise, the UE may experience SINR loss.

For interference unaware receivers, such as a Minimum Mean Square Error (MMSE) receiver, a UE with such a receiver may not be able to mitigate any co-channel interference. Thus, if the signal energy loss is not significant, but the interference suppression is significant, there may be large SINR gain by performing the MU zero forcing operation when compared to using the UE recommended precoder to perform MU-MIMO transmission directly.

On the other hand, for an interference aware receiver, such as a Minimum Mean Square Error and Interference Rejection Combiner (MMSE-IRC) receiver, a UE with, for example, 2 receiver (Rx) antenna and which only receives one layer of a downlink channel, e.g. PDSCH, then the UE may be able to suppress one dominant layer of interference. In such an exemplary situation, the zero forcing operation may suppress the inter-UE interference that can be mitigated by the receiver; therefore the signal energy is degraded. In such a case there may not be any overall SINR gain after the zero forcing operation. Instead, the transmitting side (e.g.

eNB 130) may transmit the MU-MIMO data using the UE recommended beams and leave the inter-UE interference mitigation to the receiver in the UE.

If we still use the example in FIG. 2, if both UEs have MMSE-IRC receivers, then the transmitting side (e.g. eNB 130) should transmit $p_1$ and $p_2$ instead of $w_1$ and $w_2$, because this could lead to an overall better SINR.

In another example, if a first UE (e.g. UE A 110) implements a MMSE receiver but a second UE (e.g. UE B 120) implements a MMSE-IRC receiver, the transmitting side (e.g. eNB 130) should transmit $p_1$ and $w_2$. In this case, the transmitting side, (e.g. eNB 130) is only adjusting (i.e. applying zero-forcing operation 202) the beam of the second UE since the first UE cannot mitigate inter-UE interference from the second UE due to the limitation of its receiver. This methodology may be referred to as a remote receiving device receiver-type aware precoding selection methodology.

FIG. 3 illustrates an example system that may be used at the transmitting side (e.g. eNB 130) for enhancing performance of MU-MIMO radio links. The technology described in FIG. 2 is a general structure that is applicable to more than one physical channel. The baseband signal representing an uplink/downlink physical channel can be defined using the following operations occurring in the described modules. The system may include a scrambling module 310 to scramble coded bits in codewords to be transmitted in a transmission (e.g., over a physical channel). Using information about the channel, the transmitter may tailor the transmit signal to the channel in a manner that simplifies or improves receiver processing. The receiver may generate the channel-related feedback information by processing training signals received from the transmitter.

A modulation mapper 312 may be provided to modulate the scrambled coded bits to generate modulation symbols in the transmission. These modulation symbols generated can be complex-valued modulation symbols. Different types of modulation may be used including biphase shift keying (BPSK), quadrature phase shift keying (QPSK) quadrature amplitude modulation (QAM), 8-QAM, 16-QAM, 64-QAM, and so forth. The type of modulation used may depend on the signal quality. A layer mapper 314 may then map the complex-valued modulation symbols onto one or several transmission layers 315.

A precoding module 316 may then precode modulation symbols for the transmission, for example including the zero-forcing operation discussed above. For example, the precoding may encode the complex-valued modulation symbols on each layer for transmission on the antenna ports. Precoding may be used to convert the antenna domain signal processing into the beam-domain processing. In addition, the antenna ports may also be coupled to a plurality of antennas. The transmit precoder may be chosen from a finite set of precoding matrices, called a codebook, that is known to both the receiver and the transmitter stations.

According to various embodiments of the above-described remote receiving device receiver type aware precoding section methodology, a feedback module 322 may receive a remote device receiver type from the remote device (e.g. UE A 110), via the local receiver module, e.g. 132, in order to guide the type of precoding applied using UE Receiver type feedback 323.

A resource element mapper 318 can be used to map complex-valued modulation symbols for each antenna port to the available resource elements. An OFDM signal generation module 320 can then generate a complex-valued time-division duplex (TDD) and/or frequency division duplex (FDD) OFDM signal for each antenna port 321.

The precoded transmission can then be transmitted to multiple UEs by sending the precoded transmission to the antenna ports. Specifically, the precoded transmission can be transmitted to multiple UEs using a plurality of antennas coupled to the antenna ports.

Thus, the MU-MIMO system performance and overall communication channel usage between a transmitting side (e.g. eNB 130) and one or more UEs (e.g. UE A 110 and UE B 120) can be improved by taking into account the different UE receiver capabilities.

Figure 4:
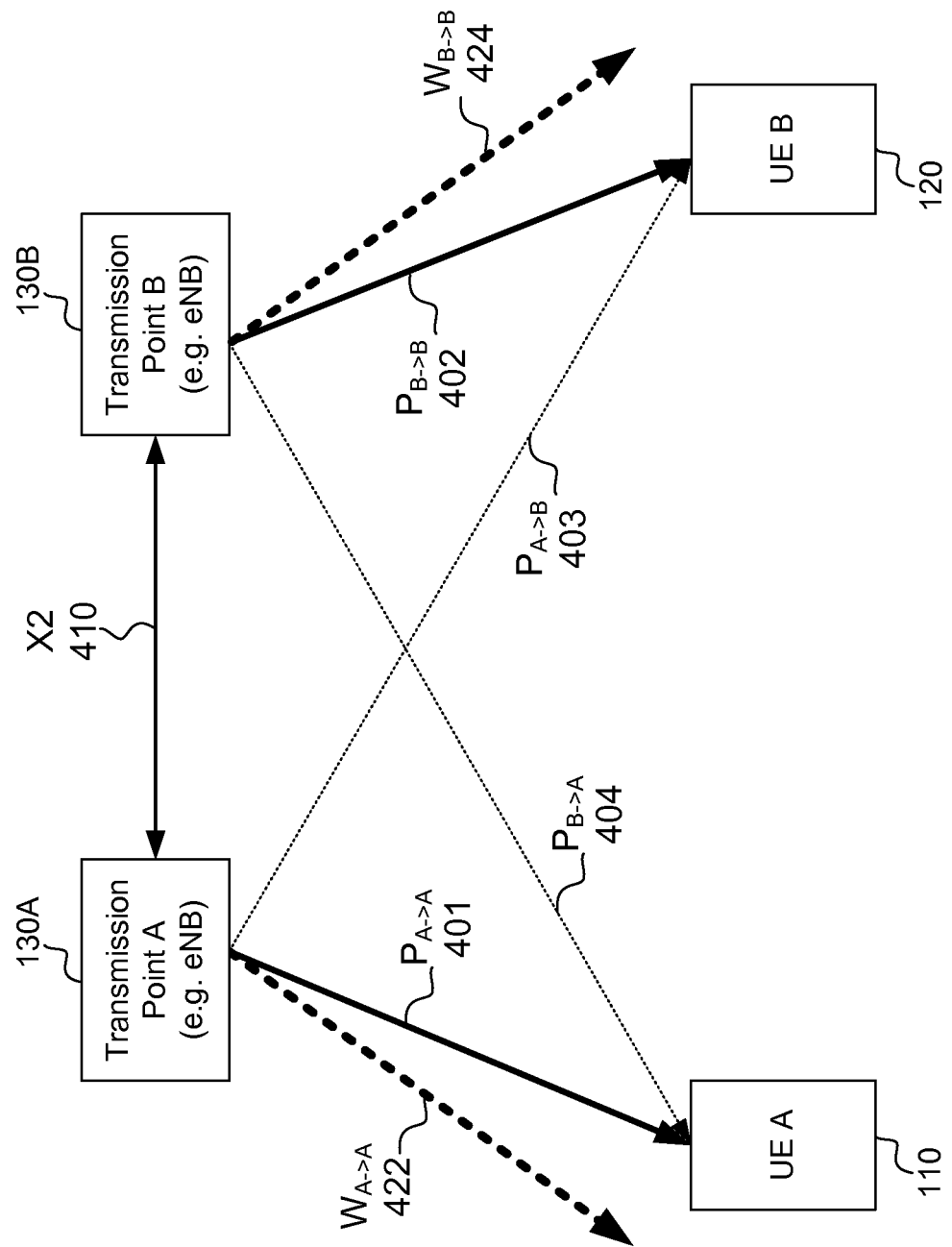
FIG. 4 schematically illustrates coordinated transmission techniques in a wireless communication network in accordance with various embodiments.

FIG. 4 gives another example of performing remote receiving device receiver-type aware precoding selection, in this case in a coordinated scheduling/coordinated beamforming (CSCB) situation. This example operates by taking into account the interference mitigation/cancellation capability of UEs from both a serving cell and neighboring cell.

In this example, there are two transmission points A (130A) and B (130B), and each serve a respective UE (UE A 110 and UE B 120) separately. Transmission point A 130A and transmission point B 130B are operating to perform CSCB. Thus, when a transmission point serves its own UE, it also tries to mitigate the interference to the UE served by the other transmission point. In order to facilitate CSCB operation, both UE not only report the recommended precoder information to its respective serving transmission point for use on the respective downlink channel from the transmitting side to the UE (e.g. $P_{A \to A}$ 401 and $P_{B \to B}$ 402), but also report the recommended precoder information to the interfering transmission point for use on the respective potential interfering downlink channel from the transmitting side to the UE (e.g. $P_{B \to A}$ 404 and $P_{A \to B}$ 403). Meanwhile, both UEs (e.g. UE A 110 and UE B 120) may also report their respective interference mitigation capability to their respective serving transmission point.

Furthermore, both transmission points 130A and 130B may also exchange the UE capability of its served UEs through an inter transmission point interface, such as an X2 410 interface. This may be beneficial when transmission from the UEs to the neighboring cells are limited (e.g. wireless resources to transmit are limited, but wired X2 links are in place). In such a way, the different transmission points are suitably notified of not only the capability of its own served UE, but also of the capability of the UEs served by its neighboring transmission point. The exemplified methodology may be scaled to encompass use by any number of transmission points—i.e. embodiments are not limited to the two transmission point example discussed in FIG. 4.

With this approach, if UE A 110 had a strong interference mitigation capability but UE B 120 had a weak interference mitigation capability, transmission point B 130 B may use the recommend precoder $P_{B \to B}$ to serve UE B 120, and this precoder may not be orthogonal to the precoder $P_{B \to A}$. At the same time, transmission point A 130A may adjust its precoder to make it orthogonal to precoder $P_{A \to B}$, thus UE B 120 may receive only small interference from transmission point A's transmission.

In order to facilitate the transmitting side (e.g. eNB 130) to apply suitable beamforming strategies for different UE receiver assumptions, a UE (e.g. UE A 110 or UE B 120) may indicate to the eNB 130 what kind of receiver it uses to demodulate, for example the UERS based PDSCH. This UE receiver type information signaling may be made to the network using, for example, Radio Resource Control (RRC) signaling.

One way to define the UE receiver type is to have a field in a RRC message, for example during an initial network access phase, where any given UA may report to the network how many dominant interferers one UE is able to mitigate.

In various embodiments, the interference mitigation/cancellation capability (i.e. type of receiver in use in the UE) may be notified to the network/eNB in the 3GPP release specific Information Element (IE), 'UE-EUTRA-Capability', for example as shown below:

```
UE-EUTRA-Capability-v1210-IEs ::= SEQUENCE {
    ...
        phyLayerParameters-v1210        PhyLayerParameters-v1210
    ...
}
Where, for example, PhyLayerParameters-v1210 could be defined further as:
PhyLayerParameters-v1210 ::=            SEQUENCE {
    ...
    ue-NumOfLayersToBeMitigated         ENUMERATED {1, 2, 4}        OPTIONAL
    ...
}
```

Figure 5:
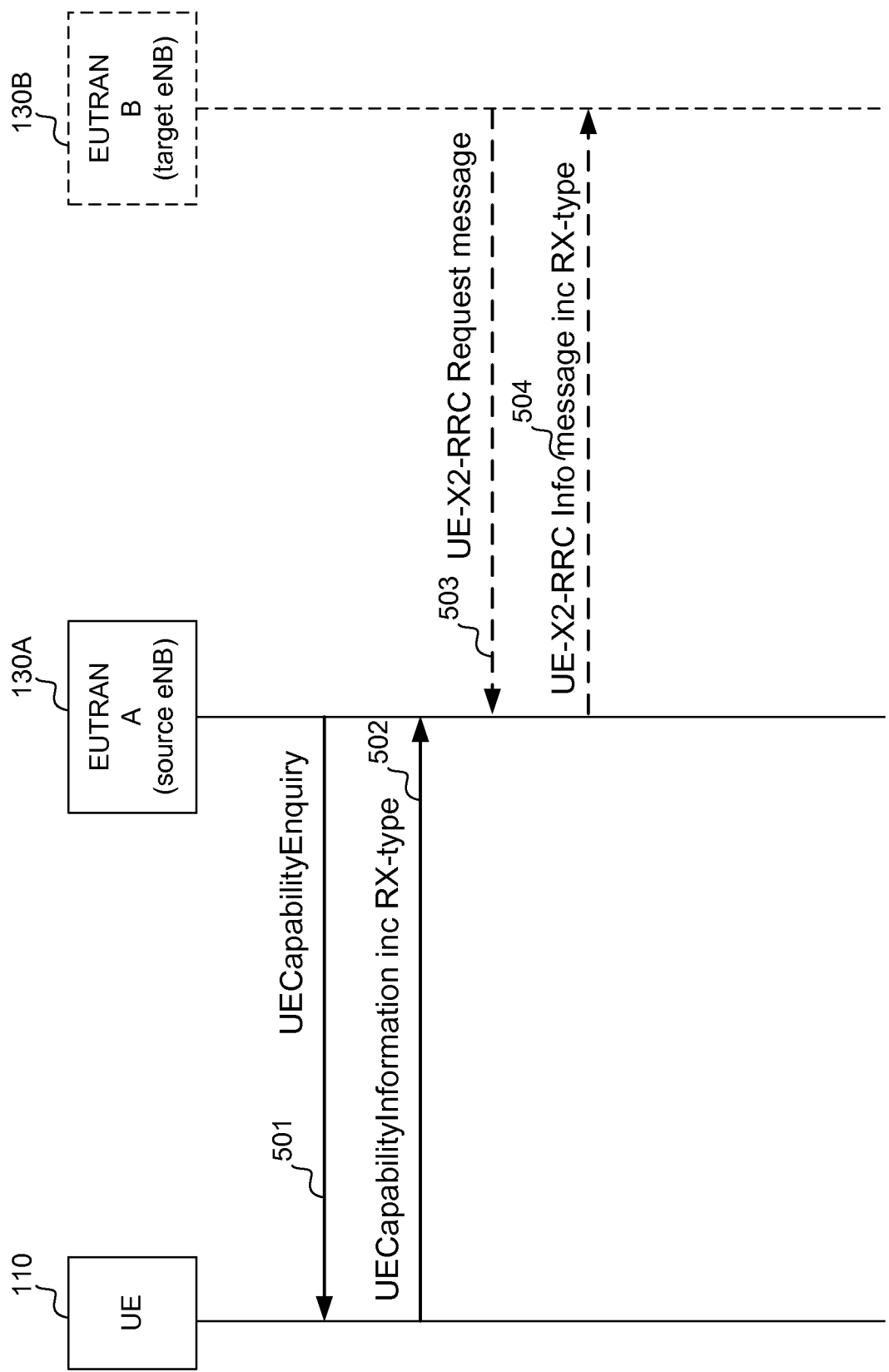
FIG. 5 schematically illustrates network provisioning messaging in accordance with various embodiments.

FIG. 5 shows, on the left hand side, use of the above described IE, between a UE 110 and first transmission point 130A (e.g. source eNB) and, on the right hand side, use of a similar IE between the first transmission point 130A and a second, neighboring transmission point 130B. In this example, there is shown a UECapabilityEnquiry transmission 501 from the eNB 130 to the UE 110, requesting the UE's receiver capability information, and a resultant UECapabilityInformation transmission 502 from the UE 110 to the eNB 130A, that includes the requested UE receiver type information. Meanwhile, the UECapabilityInformation may also be exchanged between different transmission points (e.g. source eNB 130A and target eNB 130B) over, for example, an X2 interface. In FIG. 5, this information exchange is exemplified as a UE-X2-RRC Request message 503 sent from the target eNB 130B to the source eNB 130A, requesting the UE capability information, and a return message, UE-X2-RRC information message including Receiver type message 504, sent from the source eNB 130A to the target eNB 130B. In some embodiments, the UE capability information may be sent without an initial request for such information being sent by the target eNB 130B.

The knowledge of a UE's receiver type may not only help single point MU-MIMO transmission, but it can also potentially help other more general MIMO transmission situations, such as multi-point MIMO transmission, including dynamic point selection (DPS)/dynamic point blanking (DPB) and additionally or alternatively, coordinated scheduling/coordinated beamforming (CSCB).

In order to facility coordinated multi-point transmission, X2 signaling then needs to be defined to exchange serving UEs' capability among different eNBs.

In various embodiments, it may be defined that reporting UE capability over the X2 interface (as a further information element, with respective information portions as shown in Table 1 below), where, for example, the UE EUTRA capability field is similar to the field defined in the RRC messaging specification noted above.

various embodiments. At block 610, a transmission point (or each transmission point, where there are a plurality) that serves a respective UE may request information on the respective UE's capabilities including receiver type in use at the respective UE, over any suitable return channel. In response, at block 620, the respective UE (e.g. UE A 110) may respond to (each) serving transmission point (e.g. eNB 130A and eNB 130B) with UE capability information including UE receiver type information, over an RRC channel, as discussed above.

Figure 7:
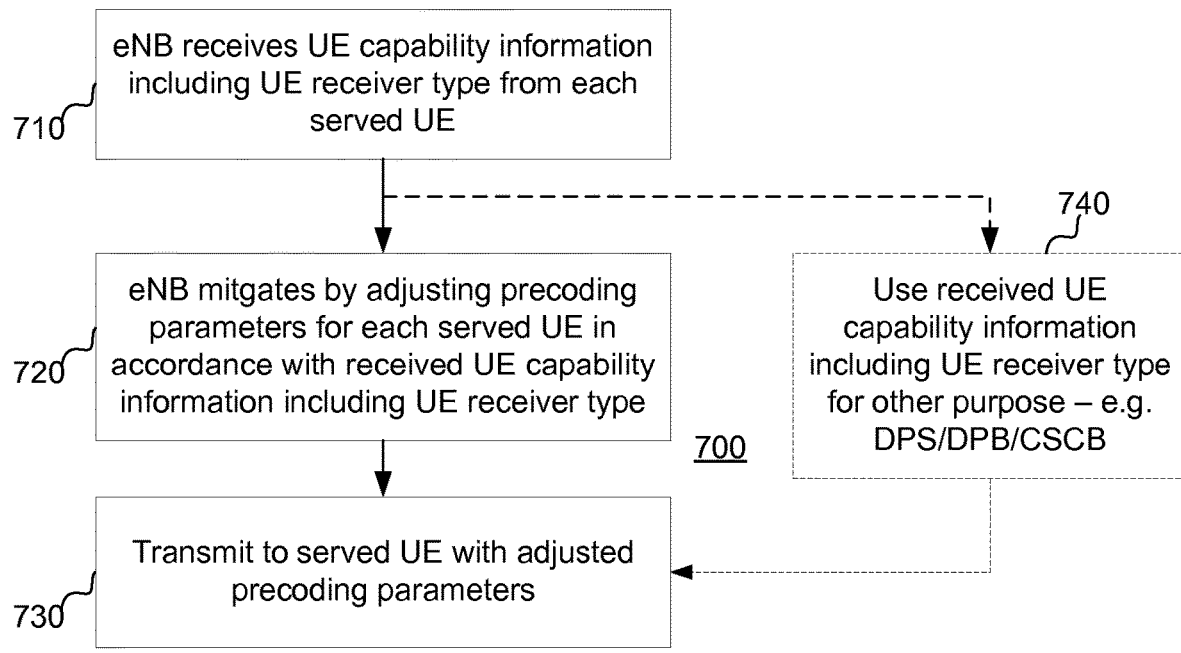
FIG. 7 is a flowchart illustrating a method in an eNB in accordance with various embodiments.

FIG. 7 is a more detailed transmitter-side reception portion (i.e. from point of view of the transmission point) flowchart illustrating a method 700 of facilitating beamforming between a transmission point (e.g. eNB) and at least one mobile device (e.g. UE) in accordance with various embodiments. At block 710, the transmission point, e.g. eNB 130 (or each transmission point, where there are a plurality) receives UE capability information including UE receiver type from the (or each) served UE (by that, respective, transmission point).

At block 720, the eNB then mitigates UE transmission issues by adjusting the precoding parameters used for each served UE in accordance with the received UE capability information, including UE receiver type (e.g. MMSE vs MMSE-IRC, or others).

At block 730, the eNB then transmits to the one or more served UEs with the adjusted precoding parameters. Meanwhile, optionally, at block 740, the received UE capability information, including UE receiver type may also be used for of purposes, e.g. DPS/DPB, potentially through onward transmission to another eNB (e.g. a potentially serving neighboring cell).

Figure 8:
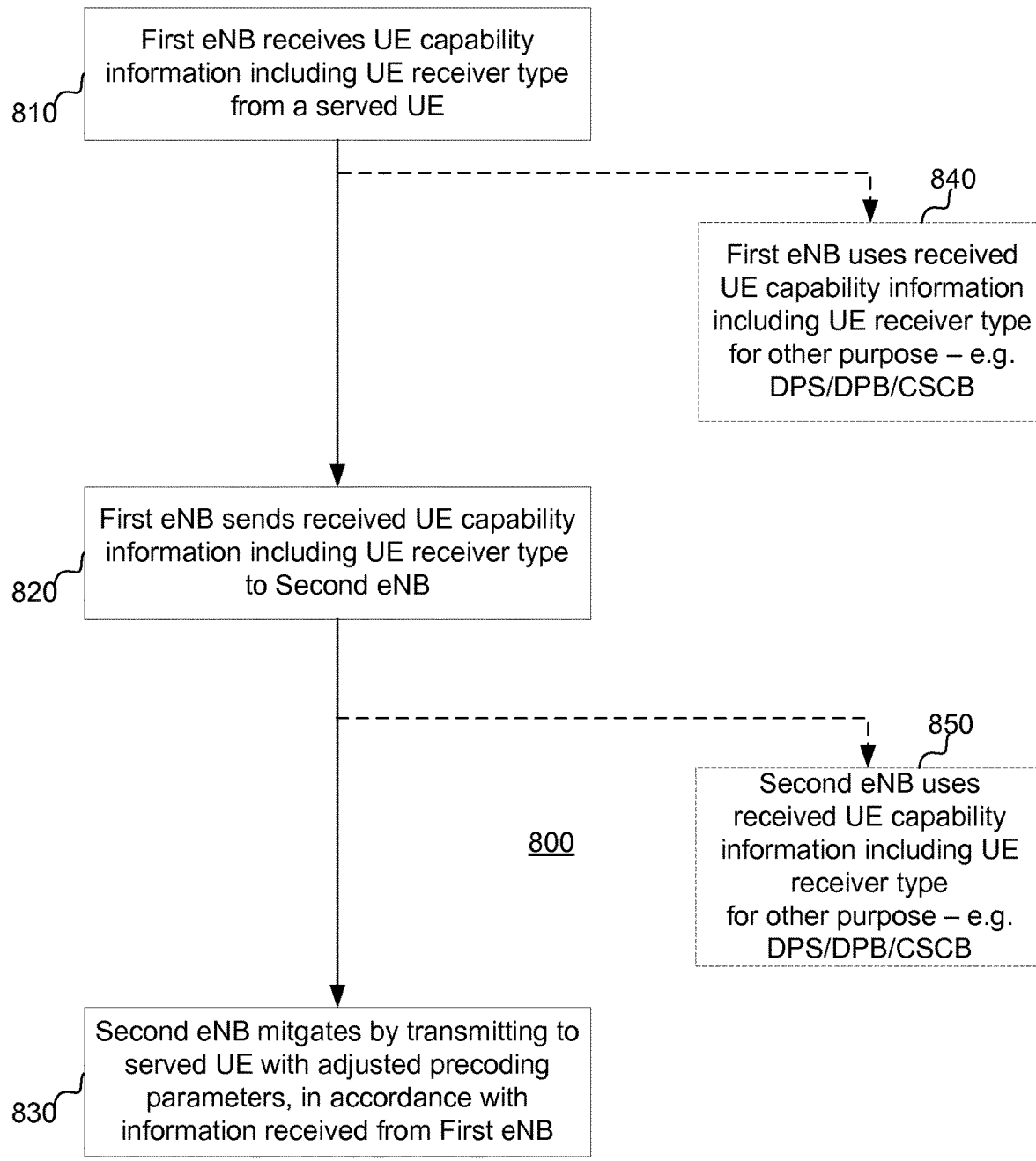
FIG. 8 is a flowchart illustrating a coordination method in a plurality of eNBs in accordance with various embodiments.

FIG. 8 is a more detailed transmitter-side reception portion (i.e. from point of view of the transmission point) flowchart illustrating a method 800 of facilitating beamforming between a plurality of transmission points (e.g. a first, source, eNB A 130 A and second, target, eNB B 130B) and at least one mobile device (e.g. UE) in accordance with various embodiments.

TABLE 1

Direction: source eNB (e.g. transmission point A 130A)
to target eNB (e.g. transmission point B 130B):

| IE/Group Name | Presence | Range | IE type and reference | Semantics description | Criticality | Assigned Criticality |
|---|---|---|---|---|---|---|
| Message Type | M | | | | YES | reject |
| Source eNB UE X2AP ID | M | | eNB UE X2AP ID 9.2.24 | Allocated at the source eNB | YES | reject |
| UE EUTRA capability | M | | | | YES | reject |

Figure 6:
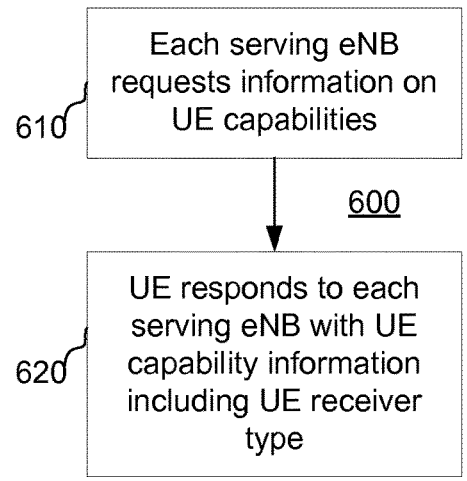
FIG. 6 is a flowchart illustrating a method in an UE in accordance with various embodiments.

FIG. 6 is a flowchart illustrating a method 600 of facilitating beamforming between a transmission point (e.g. eNB) and at least one mobile device (e.g. UE) in accordance with At block 810, the first transmission point, e.g. eNB 130A receives UE capability information including UE receiver type from a UE served by that, first transmission point 130A.

At block 820, the first transmission point 130A sends the received UE capability information including UE receiver type to a second transmission point, e.g. eNB 130B.

At block 830, the second transmission point mitigates inter-transmission point related UE transmission issues by adjusting the precoding parameters used for each of its respective served UE in accordance with the received UE capability information, including UE receiver type, from the UEs served by the first transmission point.

Similar to method 700 described in FIG. 7, optionally, at blocks 840 and 850, the received UE capability information, including UE receiver type may also be used by the first and second transmission points (e.g. eNB 130A and 130B) for other purposes.

The eNB 130 and UEs (110, 120) described herein may be implemented into a system using any suitable hardware and/or software configured to operate as described. Embodiments may also be implemented as more generic apparatus, for example, one or more discrete circuits for use in implementing a UE, mobile device or eNB.

Figure 9:
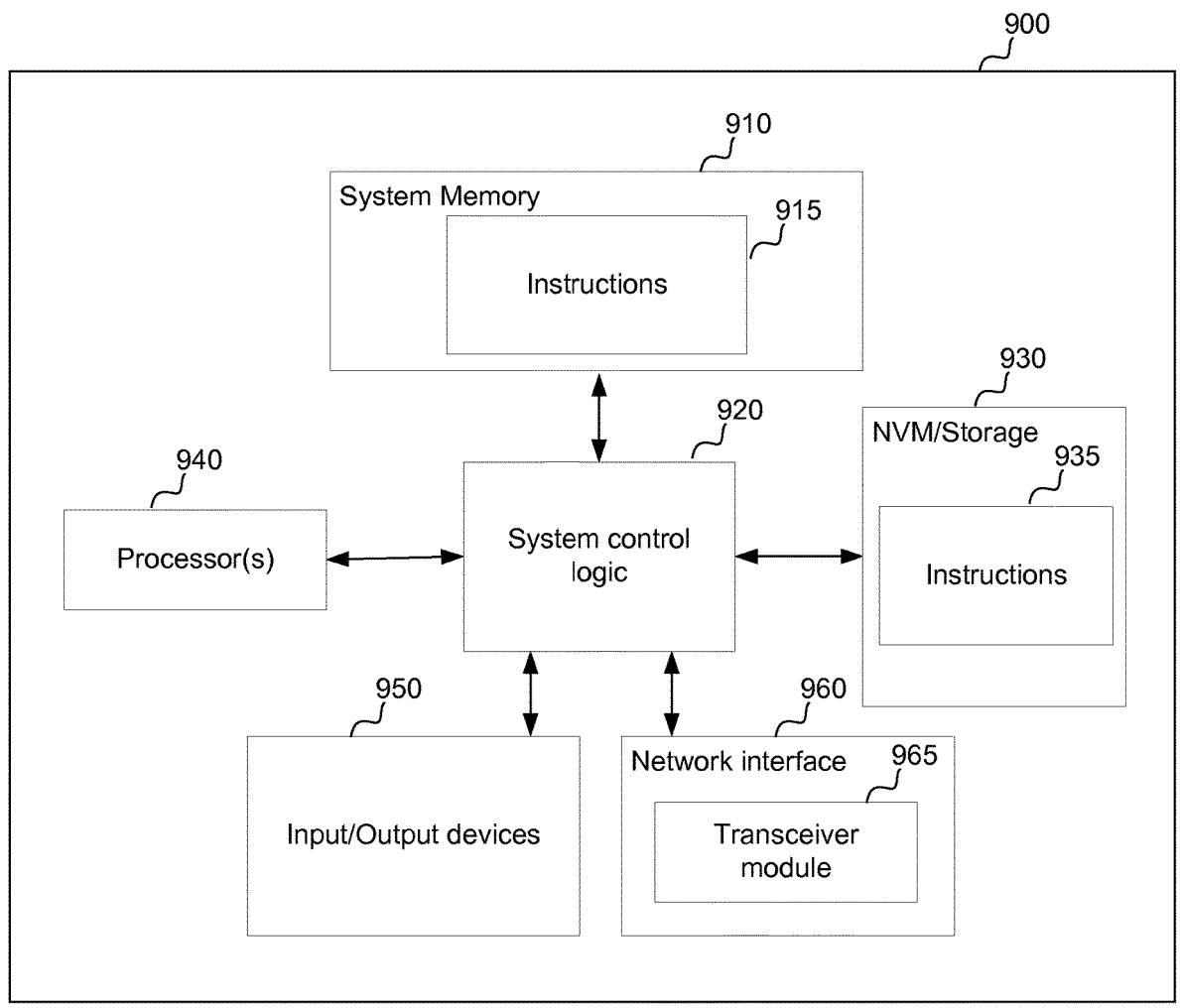
FIG. 9 schematically depicts an example system in accordance with various embodiments.

FIG. 9 illustrates, for one embodiment, an example system 900 comprising one or more processor(s) 940, system control logic 920 coupled with at least one of the processor(s) 940, system memory 910 coupled with system control logic 920, non-volatile memory (NVM)/storage 930 coupled with system control logic 920, and a network interface 960 coupled with system control logic 920. The system control logic 920 may also be coupled to Input/Output devices 950.

Processor(s) 940 may include one or more single-core or multi-core processors. Processor(s) 940 may include any combination of general-purpose processors and/or dedicated processors (e.g., graphics processors, application processors, baseband processors, etc.). Processors 940 may be operable to carry out the above described methods, or provide the above described apparatus(es), using suitable instructions or programs (i.e. operate via use of processor, or other logic, instructions). The instructions may be stored in system memory 910, as system memory portion 915, or additionally or alternatively may be stored in (NVM)/storage 930, as NVM instruction portion 935.

Processors(s) 940 may include processor modules 114, 124 or 134 and be configured to execute the embodiments of FIGS. 2-8 in accordance with various embodiments. In an embodiment in which the system 900 implements eNB 130, processor(s) 940 may include processor module 134 and be configured to transmit the UE receiver type information, as part of the UE capability information, on request from a respective transmission point, e.g. eNB 130A/B.

System control logic 920 for one embodiment may include any suitable interface controllers to provide for any suitable interface to at least one of the processor(s) 940 and/or to any suitable device or component in communication with system control logic 920.

System control logic 920 for one embodiment may include one or more memory controller(s) to provide an interface to system memory 910. System memory 910 may be used to load and store data and/or instructions, for example, for system 900. System memory 910 for one embodiment may include any suitable volatile memory, such as suitable dynamic random access memory (DRAM), for example.

NVM/storage 930 may include one or more tangible, non-transitory computer-readable media used to store data and/or instructions, for example. NVM/storage 930 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 930 may include a storage resource physically part of a device on which the system 900 is installed or it may be accessible by, but not necessarily a part of, the device. For example, the NVM/storage 930 may be accessed over a network via the network interface 960.

System memory 910 and NVM/storage 930 may respectively include, in particular, temporal and persistent copies of, for example, the instructions portions 915 and 935, respectively. Instructions portions 915 and 935 may include instructions that when executed by at least one of the processor(s) 940 result in the system 900 implementing a one or both of methods 600, 700 and/or 800, or the method(s) of any other embodiment, as described herein. In some embodiments, instructions 915 and 935, or hardware, firmware, and/or software components thereof, may additionally/alternatively be located in the system control logic 920, the network interface 960, and/or the processor(s) 940.

Network interface 960 may have a transceiver module 965 to provide a radio interface for system 900 to communicate over one or more network(s) (e.g. wireless communication network) and/or with any other suitable device. The transceiver 965 may be implement receiver module 112, 122, 132 and/or transmitter module 116, 126 and/or 136. In various embodiments, the transceiver 965 may be integrated with other components of system 900. For example, the transceiver 965 may include a processor of the processor(s) 940, memory of the system memory 910, and NVM/Storage of NVM/Storage 930. Network interface 960 may include any suitable hardware and/or firmware. Network interface 960 may be operatively coupled to a plurality of antennas 156/130 to provide a multiple input, multiple output radio interface. Network interface 960 for one embodiment may include, for example, a network adapter, a wireless network adapter, a telephone modem, and/or a wireless modem.

For one embodiment, at least one of the processor(s) 940 may be packaged together with logic for one or more controller(s) of system control logic 920. For one embodiment, at least one of the processor(s) 940 may be packaged together with logic for one or more controllers of system control logic 920 to form a System in Package (SiP). For one embodiment, at least one of the processor(s) 940 may be integrated on the same die with logic for one or more controller(s) of system control logic 920. For one embodiment, at least one of the processor(s) 940 may be integrated on the same die with logic for one or more controller(s) of system control logic 920 to form a System on Chip (SoC).

In various embodiments, the I/O devices 950 may include user interfaces designed to enable user interaction with the system 900, peripheral component interfaces designed to enable peripheral component interaction with the system 900, and/or sensors designed to determine environmental conditions and/or location information related to the system 900.

Figure 10:
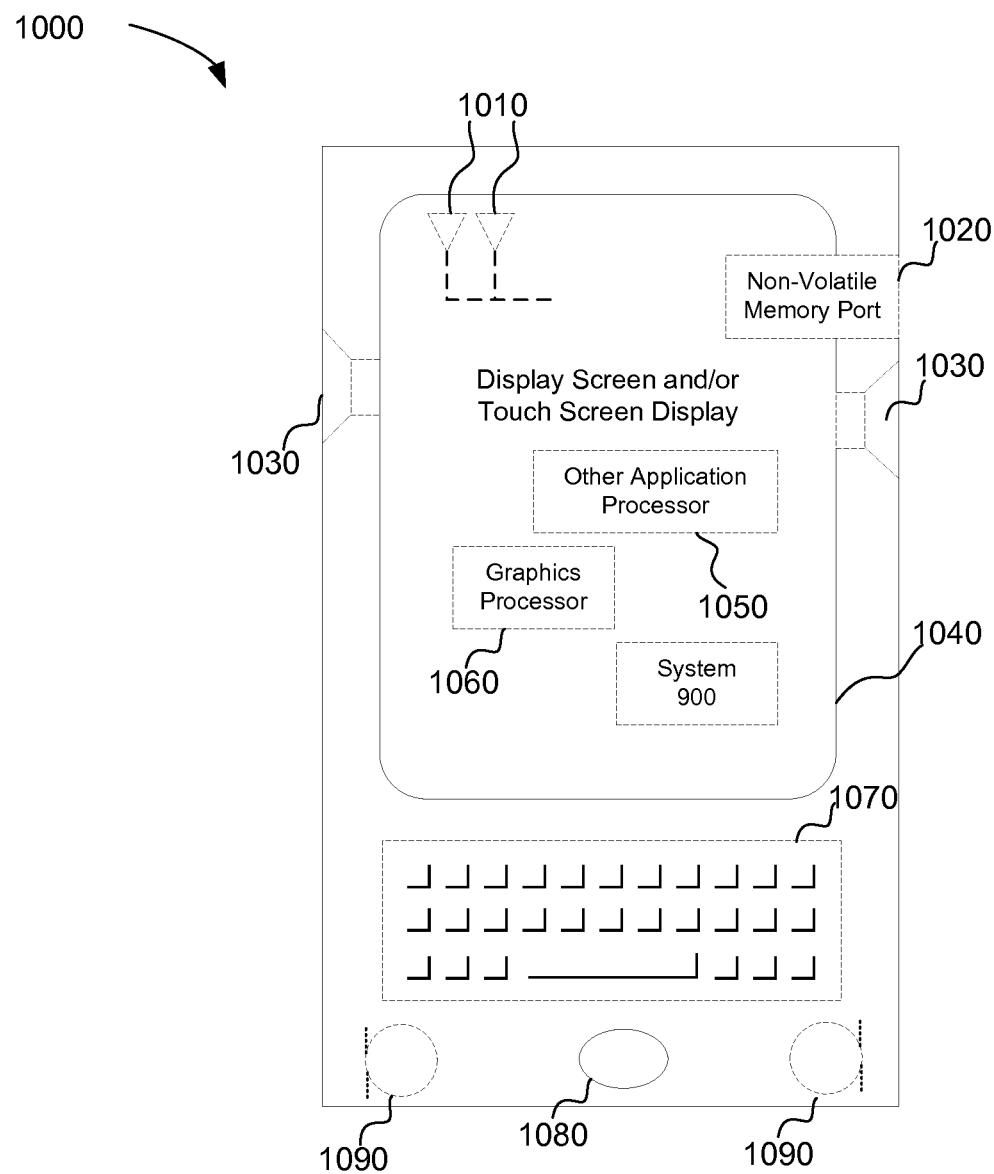
FIG. 10 schematically depicts an example mobile device in accordance with various embodiments.

FIG. 10 shows an embodiment in which the system 900 implements a UE 110, 120 in the specific form of a mobile device 1000.

In various embodiments, the user interfaces could include, but are not limited to, a display 1040 (e.g., a liquid crystal display, a touch screen display, etc.), a speaker 1030, a microphone 1090, one or more cameras 1080 (e.g., a still camera and/or a video camera), a flashlight (e.g., a light emitting diode flash), and a keyboard 1070.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 960 to communicate with components of a positioning network, e.g., a global positioning system (GPS) satellite.

In various embodiments, the system 900 may be a mobile computing device such as, but not limited to, a laptop computing device, a tablet computing device, a netbook, a mobile phone, etc. In various embodiments, system 900 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

In various embodiments, there may be provided an apparatus, for example (but not limited to) a user equipment (UE), comprising processing circuitry configured to provide an indication in a message from the UE to at least one eNB of a type of receiver available for use by the UE to receive a return message from the eNB.

In various embodiments, the return message from the eNB comprises a PDSCH message.

In various embodiments, the processing circuitry is configured to demodulate the PDSCH message through application of a UE specific reference signal.

In various embodiments, the processing circuitry is configured to provide the indication in a Radio Resource Control (RRC) message.

In various embodiments, the RRC message is one of: a UL-CCCH-Message type or UL-DCCH-Message type.

In various embodiments, the processing circuitry is configured to provide the indication in a field of the RRC message useable during an initial network access phase.

In various embodiments, the processing circuitry is configured to use the initial network access phase to report to the eNB how many dominant interferers the at least one UE is configured to cancel.

In various embodiments, the at least one eNB and/or the at least one UE comprises a portion of a wireless network, and the portion of a wireless network uses MIMO transmission techniques.

In various embodiments, the MIMO transmission techniques includes any one or more of: MU-MIMO; single point MU-MIMO; multi-point MU-MIMO; DPS/DPB; and/or CSCB.

In various embodiments, the at least one eNB comprises a first eNB and a second eNB, and the processing circuitry is further configured to provide information about the receiver to the second eNB for use by the at least one UE to receive a return message from the second eNB.

Various embodiments may also provide a user equipment (UE) comprising processing circuitry configured to notify any enhanced E Node B (eNB) that may serve the UE of a type of receiver contained within the UE.

In various embodiments, the first eNB or second eNB are operable to use the indication or provided information to control a precoding parameter in use by the first eNB or second eNB.

In various embodiments, the precoding parameter is useable by the first eNB or second eNB to apply a zero-forcing precoding operation.

In various embodiments, the eNB is configured to receive an indication, in a message from the at least one UE, of a type of receiver available for use by the UE to receive a return message from the eNB.

In various embodiments, the eNB is further configured to provide information, based upon the indication of a type of receiver available for use by the UE to receive a return message from the eNB, to a further eNB.

Various embodiments may also provide a method to facilitate beamforming between at least one eNB and a UE, comprising providing, by the UE, data indicative of a type of receiver available for use by the UE to receive a return message from the eNB.

In various embodiments, the return message from the eNB comprises a PDSCH message.

In various embodiments, the PDSCH message is to be demodulated through application of a UE specific reference signal.

In various embodiments, the indication is provided in a Radio Resource Control (RRC) message.

In various embodiments, the RRC message is one of: a UL-CCCH-Message type or UL-DCCH-Message type.

In various embodiments, the indication in an RRC message comprises a field in a RRC message useable during an initial network access phase.

In various embodiments, the initial network access phase is useable to report to the eNB how many dominant interferers the UE is configured to cancel.

In various embodiments, the at least one eNB and the UE comprises a portion of a wireless network, and the portion of a wireless network uses MIMO transmission techniques.

In various embodiments, the MIMO transmission techniques include any one or more of: MU-MIMO; single point MU-MIMO; multi-point MU-MIMO; DPS/DPB; and/or CSCB.

In various embodiments, the at least one eNB comprises a first eNB and a second eNB, and the method further comprises providing the second eNB information about a type of receiver available for use by the UE to receive a return message from the first eNB or second eNB.

In various embodiments, the first eNB with information about a type of receiver available for use by a UE served by the second eNB.

In various embodiments, the first eNB or second eNB are operable to use the indication or provided information to control a precoding parameter in use by the first eNB or second eNB.

In various embodiments, the precoding parameter is useable by the first eNB or second eNB to apply a zero-forcing precoding operation.

Various embodiments also provide a method to facilitate beamforming between at least one eNB and at least one UE, comprising the at least one eNB receiving an indication of a type of receiver available for use by the at least one UE to receive a return message from the eNB.

Various embodiments also provide a computer readable medium comprising instructions, which, when executed, cause a processor to carry out any of the described methods.

Thus various embodiments provide both a receiving-side and transmitting-side version of method and apparatuses, interoperable with one another to facilitate beamforming between the transmitting side and receiving side, for example in a MIMO environment. These variable embodiments may include, but are not limited to a mobile device comprising means to carry out any of the described methods, a corresponding transmission point, such as an eNB comprising means to carry out any of the described methods, or a system comprising one or more of each apparatuses. Embodiments also provide for any computer readable medium comprising instructions, which, when executed, cause a processor to carry out any of the described methods.

EXAMPLES

The following examples pertain to further embodiments.

Example 1 is an apparatus, for example (but not limited to) a user equipment (UE), for use in a wireless communication system, the user equipment comprising processing circuitry configured to provide an indication in a message from the UE to at least one eNB of a type of receiver available for use by the UE to receive a return message from the eNB.

Example 2 may be the subject matter of Example 1, but where, optionally, the return message from the eNB comprises a PDSCH message.

Example 3 may be the subject matter of Example 2, but where, optionally, the processing circuitry is further configured to demodulate the PDSCH message through application of a UE specific reference signal.

Example 4 may be the subject matter of any one or more of Examples 1 to 3, but where, optionally, the processing circuitry is configured to provide the indication in a Radio Resource Control (RRC) message.

Example 5 may be the subject matter of Example 4, but where, optionally, the RRC message is one of: a UL-CCCH-Message type or UL-DCCH-Message type.

Example 6 may be the subject matter of Example 4, but where, optionally, the processing circuitry is configured to provide the indication in a field of the RRC message useable during an initial network access phase.

Example 7 may be the subject matter of Example 6, but where, optionally, the processing circuitry is configured to use the initial network access phase to report to the eNB how many dominant interferers the at least one UE is configured to cancel.

Example 8 may be the subject matter of any one or more of Examples 1 to 7, but where, optionally, the at least one eNB and/or the at least one UE comprises a portion of a wireless network, and the portion of a wireless network uses MIMO transmission techniques.

Example 9 may be the subject matter of Example 6, but where, optionally, the MIMO transmission techniques include any one or more of: MU-MIMO; single point MU-MIMO; multi-point MU-MIMO; DPS/DPB; and/or CSCB.

Example 10 may be the subject matter of any one or more of Examples 1 to 9, but where, optionally, the at least one eNB comprises a first eNB and a second eNB, and the processing circuitry is further configured to provide information about the receiver to the second eNB for use by the at least one UE to receive a return message from the second eNB.

Example 11 is an apparatus, for example a user equipment (UE) or component processing circuitry portion thereof, for use in a wireless communication system, comprising processing circuitry configured to notify any enhanced E Node B (eNB) that may serve the UE of a type of receiver contained within the UE.

Example 12 is an apparatus, for example an eNB or component processing circuitry portion thereof, for serving at least one UE, wherein the eNB is configured to receive an indication, in a message from the at least one UE, of a type of receiver available for use by the UE to receive a return message from the eNB.

Example 13 may be the subject matter of Example 12, but where, optionally, the eNB is further configured to provide information, based upon the indication of a type of receiver available for use by the UE to receive a return message from the eNB, to a further eNB.

Example 14 is a method to facilitate beamforming between at least one eNB and a UE, comprising providing, by the UE, data indicative of a type of receiver available for use by the UE to receive a return message from the eNB.

Example 15 may be the subject matter of Example 14, but where, optionally, the return message from the eNB comprises a PDSCH message.

Example 16 may be the subject matter of Example 15, but where, optionally, the PDSCH message is to be demodulated through application of a UE specific reference signal.

Example 17 may be the subject matter of any of Examples 14 to 16, but where, optionally, the indication is provided in a Radio Resource Control (RRC) message.

Example 18 may be the subject matter of Example 17, but where, optionally, the RRC message is one of: a UL-CCCH-Message type or UL-DCCH-Message type.

Example 19 may be the subject matter of Examples 17 or 18, but where, optionally, the indication in an RRC message comprises a field in a RRC message useable during an initial network access phase.

Example 20 may be the subject matter of Example 19, but where, optionally, the initial network access phase is useable to report to the eNB how many dominant interferers the UE is configured to cancel.

Example 21 may be the subject matter of Example 14, but where, optionally, the at least one eNB and the UE comprises a portion of a wireless network, and the portion of a wireless network uses MIMO transmission techniques.

Example 22 may be the subject matter of Example 21, but where, optionally, the MIMO transmission techniques include any one or more of: MU-MIMO; single point MU-MIMO; multi-point MU-MIMO; DPS/DPB; and/or CSCB.

Example 23 may be the subject matter of any one or more of Examples 14 to 22, but where, optionally, the at least one eNB comprises a first eNB and a second eNB, and the method further comprises providing the second eNB information about a type of receiver available for use by the UE to receive a return message from the first eNB or second eNB.

Example 24 may be the subject matter of any one or more of Examples 14 to 23, but where, optionally, the method further comprises providing the first eNB with information about a type of receiver available for use by a UE served by the second eNB.

Example 25 may be the subject matter of Example 23, but where, optionally, the first eNB or second eNB are operable to use the indication or provided information to control a precoding parameter in use by the first eNB or second eNB.

Example 26 may be the subject matter of Example 25, but where, optionally, the precoding parameter is useable by the first eNB or second eNB to apply a zero-forcing precoding operation.

Example 27 is a method to facilitate beamforming between at least one eNB and at least one UE, comprising: the at least one eNB receiving an indication of a type of receiver available for use by the at least one UE to receive a return message from the eNB.

Example 28 is a computer readable medium comprising instructions, which, when executed, cause a processor to carry out any of method Examples 14 to 27.

Example 29 is an apparatus comprising means to carry out the method of any of Examples 14 to 27.

Example 30 is an eNB comprising means to carry out the method of Example 27.

Example 31 is an apparatus for use in a wireless communication system, comprising processing circuitry configured to provide a message to an eNB indicative of a type of receiver operable for use by the apparatus to receive a return message from the eNB.

Example 32 may be the subject matter of Example 31, but where, optionally, the apparatus is a UE. Specifics in the examples may be used anywhere in one or more embodiments.

One skilled in the art understands that a "processing circuitry configured to" performs a function comprising at least one of "hardware configured to", "software configured to" and a "combination of hardware and software configured to" perform that function.

What is claimed is:

1. A user equipment (UE) for use in a wireless communication system, the user equipment comprising:
   memory; and
   processing circuitry configured to:
   generate a UE message to provide an indication to at least one eNB of a type of receiver available for use by the UE to receive a return message from the eNB; and
   output that UE message for transmission to the at least one eNB,
   wherein the indication of the type of receiver available for use by the UE enables the eNB to select a beamforming scheme for communicating with the UE,
   wherein the beamforming scheme involves selecting one of a recommended precoder or a zero forcing precoder for the UE depending on when the type of receiver in the UE, as indicated in the UE message outputted for transmission from the UE to the eNB, is a Minimum Mean Square Error (MMSE) receiver or a Minimum Mean Square Error and Interference Rejection Combiner (MMSE-IRC) receiver,
   wherein the indication is provided from the UE during an initial network access phase, and the initial network access phase is used by the UE to report to the eNB how many dominant interferers the UE is configured to cancel to define in part the type of receiver available for use by the UE.

2. The UE of claim 1, wherein the return message from the eNB comprises a PDSCH message.

3. The UE of claim 2, wherein the processing circuitry is configured to demodulate the PDSCH message through application of a UE specific reference signal.

4. The UE of claim 1, wherein the processing circuitry is configured to provide the indication in a Radio Resource Control (RRC) message.

5. The UE of claim 4, wherein the RRC message is one of: a UL-CCCH-Message type or UL-DCCH-Message type.

6. The UE of claim 4, wherein the processing circuitry is configured to provide the indication in a field of the RRC message useable during the initial network access phase.

7. The UE of claim 1, wherein the at least one eNB and/or the UE comprises a portion of a wireless network, and the portion of a wireless network uses MIMO transmission techniques.

8. The UE of claim 7, wherein the MIMO transmission techniques includes any one or more of: MU-MIMO; single point MU-MIMO; multi-point MU-MIMO; DPS/DPB; and/or CSCB.

9. The UE of claim 1, wherein the at least one eNB comprises a first eNB and a second eNB, and the processing circuitry is further configured to provide information about the receiver to the second eNB for use by the UE to receive a return message from the second eNB.

10. An eNB for serving at least one UE, the eNB comprising:
    memory; and
    processing circuitry configured to:
    receive an indication, in a message from the at least one UE, of a type of receiver available for use by the UE to receive a return message from the eNB; and
    select a beamforming scheme to utilize for communicating with the UE based on the indication of the type of receiver available for use by the UE,
    wherein the beamforming scheme involves selecting one of a recommended precoder or a zero forcing precoder for the UE depending on when the type of receiver in the UE, as indicated in the message received from the UE, is a Minimum Mean Square Error (MMSE) receiver or a Minimum Mean Square Error and Interference Rejection Combiner (MMSE-IRC) receiver,
    wherein the indication is received from the UE during an initial network access phase, and a report of how many dominant interferers the at least one UE is configured to cancel is received from the UE during the initial network access phase to define in part the type of receiver available for use by the UE.

11. The eNB of claim 10, wherein the processing circuitry is further configured to provide information, based upon the indication of a type of receiver available for use by the UE to receive a return message from the eNB, to a further eNB.

12. A method to facilitate beamforming between at least one eNB and a UE, comprising:
    providing, by the UE, data indicative of a type of receiver available for use by the UE to receive a return message from the eNB, wherein the data indicative of the type of receiver available for use by the UE enables the eNB to select a beamforming scheme for communicating with the UE,
    wherein the beamforming scheme involves selecting one of a recommended precoder or a zero forcing precoder for the UE depending on when the type of receiver in the UE, as indicated in the data provided by the UE to the eNB, is a Minimum Mean Square Error (MMSE) receiver or a Minimum Mean Square Error and Interference Rejection Combiner (MMSE-IRC) receiver,
    wherein the data indicative of the type of receiver is provided from the UE during an initial network access phase, and the initial network access phase is used by the UE to report to the eNB how many dominant interferers the UE is configured to cancel to define in part the type of receiver available for use by the UE.

13. The method of claim 12, wherein the return message from the eNB comprises a PDSCH message.

14. The method of claim 12, wherein the at least one eNB comprises a first eNB and a second eNB, and the method further comprises providing second eNB information about a type of receiver available for use by the UE to receive a return message from the first eNB or second eNB.

15. The method of claim 14, further comprising providing the first eNB with information about a type of receiver available for use by a UE served by the second eNB.

16. The method of claim 14, wherein the first eNB or second eNB are operable to use the indication or provided information to control a precoding parameter in use by the first eNB or second eNB.

17. The method of claim 16, wherein the precoding parameter is useable by the first eNB or second eNB to apply a zero-forcing precoding operation.

18. A non-transitory computer readable medium comprising instructions, which, when executed, cause a processor to carry out the method of claim 12.

* * * * *